A. H. WHITESIDE.
Harrow.

No. 163,428.    Patented May 18, 1875.

UNITED STATES PATENT OFFICE.

ADDISON H. WHITESIDE, OF ONARGA, ILLINOIS.

IMPROVEMENT IN HARROWS.

Specification forming part of Letters Patent No. 163,428, dated May 18, 1875; application filed April 10, 1875.

*To all whom it may concern:*

Be it known that I, ADDISON H. WHITESIDE, of Onarga, Iroquois county, Illinois, have invented a new and Improved Harrow, of which the following is a specification:

My invention consists of a right-angle shaped tooth, with one end let into the harrow-frame obliquely to the cross-section, and confined by a stable, which holds the tooth perpendicular when the harrow is drawn by one end, and allows it to swing outward and backward obliquely to the line of the beam, and also to the horizon when drawn by the other end, thus combining two different harrows in one.

The staple is secured, so as to be readily detached, by a nut on one of the prongs, which goes through the beam, to allow of taking out the tooth readily for sharpening it or for any purpose.

Figure 1:
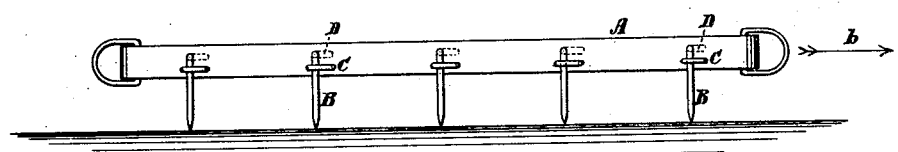
Figure 2:
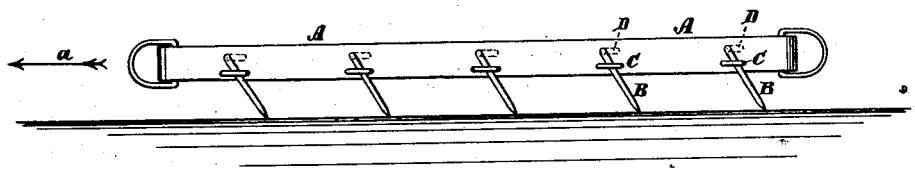
Figure 3:
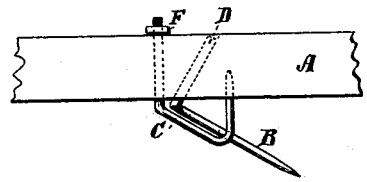

Figure 1 is a side elevation of my improved harrow, showing the teeth in vertical position. Fig. 2 is a side elevation, showing the teeth inclined, and Fig. 3 is a detail in plan view on an enlarged scale, illustrating the arrangement.

Similar letters of reference indicate corresponding parts.

A is the beam, B the tooth, and C the staple for securing the tooth, the tooth being a bar or rod of any desired size and form, with an arm at the top bent to a right angle with the main portion. The arm is fitted in a horizontal hole in the side of the beam, obliquely to its cross-section, as shown at D, and it is confined by the staple C, which is located considerably below the arm, and swells out from the side and extends back along the beam to allow the tooth to swing back when the harrow is drawn in the direction of the arrow *b*. The outward swell of the staple is to allow the tooth to slant in the plane of the draft, when the harrow is drawn diagonally to the beams, by hitching to the corner, or near the corner. One prong of the staple goes through the beam, and is secured by a nut, F, while the other prong enters a socket in the side of the beam sufficiently to be steadied properly.

Having thus described my invention, I claim as new and desire to secure by Letters Patent—

1. A harrow-tooth connected to the beam by a right-angled arm at the upper end, fitted in a hole oblique to the cross-section of the beam, substantially as specified.

2. The combination of the staple C, having the outward swell and rearward extension, as described, with a harrow-tooth connected with the beam by a right-angled arm of the upper end, in a hole oblique to the cross-section, substantially as specified.

ADDISON H. WHITESIDE.

Witnesses:
B. H. DURHAM,
EZRA D. DURHAM.